United States Patent [19]
Fischer et al.

[11] 3,767,219
[45] Oct. 23, 1973

[54] ADJUSTABLE CHUCK CONSTRUCTION

[76] Inventors: David Fischer, Mainparkstrasse 6, Mainaschaff; Rudolf Kohlert, Frankenstrasse 19, Stockstadt, both of Germany

[22] Filed: July 26, 1971

[21] Appl. No.: 164,798

[30] Foreign Application Priority Data
July 6, 1971    Germany.................. P 21 33 446.3
July 29, 1970   Germany.................. P 20 37 663.0

[52] U.S. Cl.................. 279/106, 279/1 G, 269/238
[51] Int. Cl............................................ B23b 31/18
[58] Field of Search................... 279/106, 107, 35, 279/38, 39, 40, 1 G; 269/238

[56] References Cited
UNITED STATES PATENTS
2,443,895   6/1948   Day et al. ................... 279/1 G

FOREIGN PATENTS OR APPLICATIONS
1,065,095   4/1967   Great Britain.................... 279/106

*Primary Examiner*—Francis S. Husar
*Attorney*—David Toren et al.

[57] ABSTRACT

In an adjustable chuck arrangement a carrier is axially displaceable within a bell-shaped base and restraining elements are hinged to the carrier and extend outwardly through openings in a supporting plate attached to the base. When the carrier is displaced axially relative to the base, the restraining elements are also displaced in the axial direction. Further, the surfaces of the restraining elements, where they pass through the supporting plate, are shaped so that as they move axially they contact the surfaces of the openings in the supporting plate and pivot about their hinged connections. Clamping devices secure the restraining elements to the carrier and provide the hinged connections for the elements. The position of the clamping devices in the carrier can be reversed through 180° for adjusting the location of the restraining elements relative to the axis of the chuck.

20 Claims, 6 Drawing Figures

Patented Oct. 23, 1973 3,767,219

Inventors:
DAVID FISCHER
RUDOLF KOHLERT
BY Toren and McGeady
attorneys

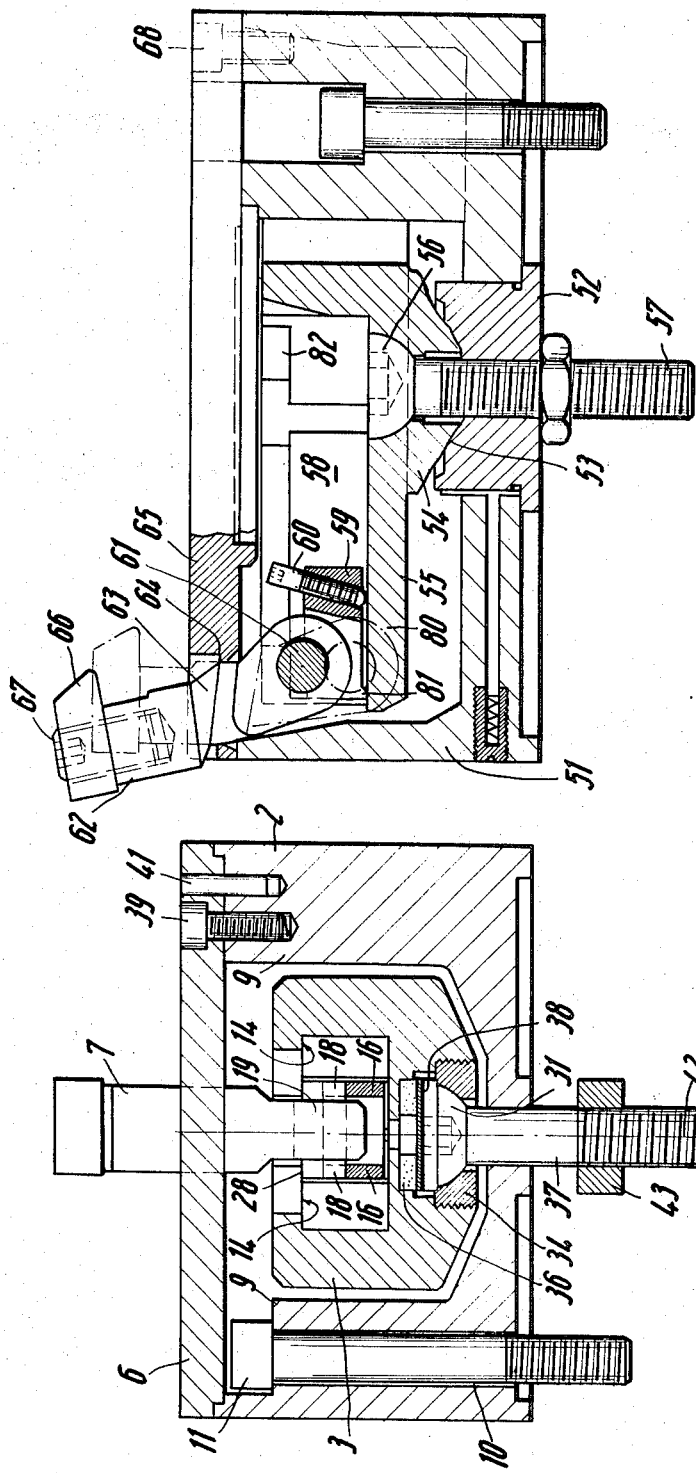

3,767,219

ADJUSTABLE CHUCK CONSTRUCTION

SUMMARY OF THE INVENTION

The present invention is directed to an adjustable chuck arrangement and, more particularly, it concerns the arrangement of restraining elements hinged to a carrier within a base so that the carrier and the restraining elements can be displaced in the axial direction and, further, the restraining elements can be pivoted due to the relationship between them and a supporting plate extending transversely across the base.

Chucks of the type to which the present invention is directed are known as finger chucks. Such chucks are used for clamping a work piece in the axial direction during a machining operation either because of the form of the work piece or to afford adequate holding strength as it is machined. The holding force provided by the restraining elements is directed toward the axis of rotation of the machine tool. In presently known axial chucks the restraining elements have an angular form and in cross-section they have a rectangular shape. Accordingly, the openings in the supporting plate through which the restraining elements extend also have a rectangular shape. As a result, the production of the restraining elements and the formation of the openings in the supporting plates is complicated and costly.

The primary object of the present invention is to provide an axial chuck which is simpler to produce and to reset as compared to axial chucks presently available. To provide a solution to the problems experienced in the past, the openings through the supporting plate for the restraining elements are formed by conventional boring or drilling means and each restraining element has a shaft with an offset elliptical section which extends through and is in contact with the surface of the opening through the supporting plate. The offset elliptical surfaces contacting the surfaces of the openings provide a pivoting action to the restraining elements so that they move inwardly and outwardly relative to the axis of rotation of the chuck.

Chucks formed in accordance with the present invention are particularly simple to produce. The openings through the supporting plate can be drilled with great precision on a simple drilling machine and the restraining elements can be produced by precision casting methods. Additionally, the manner in which the restraining elements are guided by the bores or openings through the supporting plate assures reliable guidance during displacement and also affords an adequate sealing action against the introduction of dirt into the chuck. As the restraining elements are displaced during the opening and closing movements of the chuck, the surfaces of the openings through the supporting plate enclose and contact the surfaces of the restraining element shaft. Further, the surfaces of the offset elliptical sections of the restraining elements are slightly conical with the exception of laterally extending marginal strips.

Where relatively thicker supporting plates are used it is advisable if the openings are chamfered. Accordingly, it is possible to use larger sections for the shafts of the restraining elements with the same bore diameter, because the offset sections of the restraining elements can be made relatively thick.

In general, axial chucks can only be used for a limited clamping range, due to the pivotal movement of the restraining elements required for inserting and removing the work piece to be machined and because the bent ends of the elements must rest flat against the bearing surfaces of the work piece to avoid any damage to the work piece. When work pieces having a different form or different dimensions are used, a new chuck is required. As a result, it has been necessary to maintain a complete assortment of axial chucks to be able to work on various work pieces.

Another feature of the present invention which limits the need for replacement of the axial chuck, is the provision of radial grooves in the carrier within which the restraining elements are hinged and can be radially displaced and locked. Accordingly, the restraining elements can be movably positioned through the grooves in the carrier and then locked in position for use. As a result, the position of the restraining elements can be adjusted in accordance with the form or dimension of the work piece to be held in the chuck. When the restraining elements are repositioned within the chuck it is only necessary to provide a supporting plate having the openings properly located to receive the shafts of the restraining elements. Providing such supporting plates can be easily accomplished by very simply and accurately drilling the required holes or openings through the supporting plate. It may be possible to redrill the previously used supporting plate or, if necessary, a new supporting plate can be used, however, in any case this arrangement of an adjustable axial chuck is considerably less expensive than providing a new chuck.

In a preferred arrangement of the chuck, the carrier has a number of radially extending webs into which grooves are cut. A carrier with six such webs has a particularly wide field of application, since it can be used to hold two, three, four or six restraining elements.

Where the carrier is formed with a number of radially extending webs, the base can be shaped to provide a number of recesses corresponding in number and form to the configuration of the webs in the carrier.

The grooves formed by the webs can be either dovetailed or T-shaped. Hinge bolts for the restraining elements can be arranged projecting outwardly from the hinge bore so that the ends engage the surfaces of the grooves and the restraining forces exerted by the restraining elements are transmitted through the hinge bolts to the retaining surfaces of the grooves in the carrier and thus to the carrier.

Restraining elements can be locked in the grooves by positioning clamping bodies into the grooves so that they support the hinge bolts and press the ends of the hinge bolts upwardly against the retaining surfaces of the grooves. Preferably, the clamping bodies have a U-shaped or forked configuration with a locking screw positioned in the closed end or bight portion of the clamping body. The locking screw passes through and is positioned on a central plane of the locking body and when the screw is tightened the clamping body turns about its supporting edges and presses the hinge bolt upwardly against the retaining surfaces of the groove.

The position of the clamping bodies within the grooves in the carrier can be reversed through 180° for effecting a substantial radial displacement in the location of the restraining elements. By reversing the clamping body, a restraining element can be moved from a location adjacent the circumferential periphery of the chuck to a location adjacent the axis of the chuck. Further, the direction of insertion of the restraining elements can be reversed through 180° so that the clamping action is effected about a radially inner edge of the work piece instead of a radially outer edge. In such an arrangement the restraining elements can be inserted so that their clamping fingers are directed outwardly and the direction in which the elements pivot between the locked and unlocked positions is also reversed.

At the point of contact between the hinge bolts and the retaining surfaces of the grooves, the hinge bolts can be flattened so that any damage to the retaining surfaces of the grooves is avoided. If more than three restraining elements are used, it is advisable to provide a layer of elastic material between the flattened surfaces on the hinge bolts and the retaining surfaces of the grooves. To assure that the layers of elastic material are not deformed when the restraining elements are locked in the chuck, each of the legs of the U-shaped clamping bodies are provided with cams located between the recesses for the hinge pin and the locking screw at the closed end of the U-shaped body. As the clamping bodies are secured in place by the locking screw the cams are forced upwardly against the retaining surfaces of the grooves and prevent deformation of the layers of elastic material.

At the closed end of the U-shaped clamping bodies an offset portion having a width less than the distance between the edges of the retaining surfaces of the grooves, is provided. This shape of the clamping body is of particular advantage in the insertion of the clamping bodies with the restraining elements and hinge bolts into the grooves. At the center of the carrier an opening is provided which extends downwardly to the bottom of the grooves provided between the webs. Due to the reduced width of the offset base portion of the clamping body, the downwardly extending opening within the carrier can be reduced to a minimum diameter. The opening within the carrier need only be of sufficient diameter so that the leg or fork portion of the U-shaped clamping body can be introduced downwardly into the opening while the offset part at its closed base can extend, depending on the orientation of the clamping part, either into an opposite groove or into the groove into which the clamping body is to be introduced.

For effecting the axial movement of the carrier, a tie rod extends through the closed end of the base and is connected by a ball and socket joint to the carrier. If the ball portion of the joint adjoins the opening in the center of the carrier, it is flattened in a chordal manner so that a resulting end face is provided which extends across the bottom of the groove in the carrier or, if necessary, below the bottom of the groove. With this arrangement, a clamping body can be adjusted within the central portion of the carrier on the line of the tie rod. To maintain the carrier in a position normal to the tie rod of the chuck, a prestressed elastic element having a metal disc on one side, is positioned between the surface of the carrier and the flat surface of the ball of the ball and socket joint on the tie rod. This construction facilitates resetting and adjusting operations and it also protects against any accidental loosening of the tie rod.

Another feature of the invention is the provision of exchangeable clamping fingers on the restraining elements which can be secured by bolts with different threads or by bolts with oppositely extending threads.

This feature of the restraining elements affords greater adaptability of the chuck to work pieces of different dimensions and form. The clamping fingers are simpler and less expensive than restraining elements as presently used, without special clamping fingers. In the present invention the same restraining elements can be used for work pieces having different diameters and heights. Where different heights are involved, only the clamping fingers need to be exchanged.

With this arrangement of the chuck, in addition to the advantages mentioned above, it is also possible to retain the carrier in the base on the machine tool for resetting the chuck for work pieces with a different diameter. All of the necessary resetting steps can be carried out from the end face of the chuck, and resetting the restraining elements from an outward clamping arrangement on a work piece to a inward clamping arrangement can also be effected.

This arrangement of an axial chuck permits a very flat construction so that the chuck can be attached on any spindle nose of a machine tool in a corresponding design without any intermediate flange.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 3 is a sectional view taken along the line III—III in FIG. 1;

FIG. 4 is a sectional view of another chuck formed in accordance with the present invention and arranged to support three restraining elements as compared to the chuck in FIG. 1 which can hold up to six restraining elements;

DETAILED DESCRIPTION OF THE INVENTION

Figure 2:
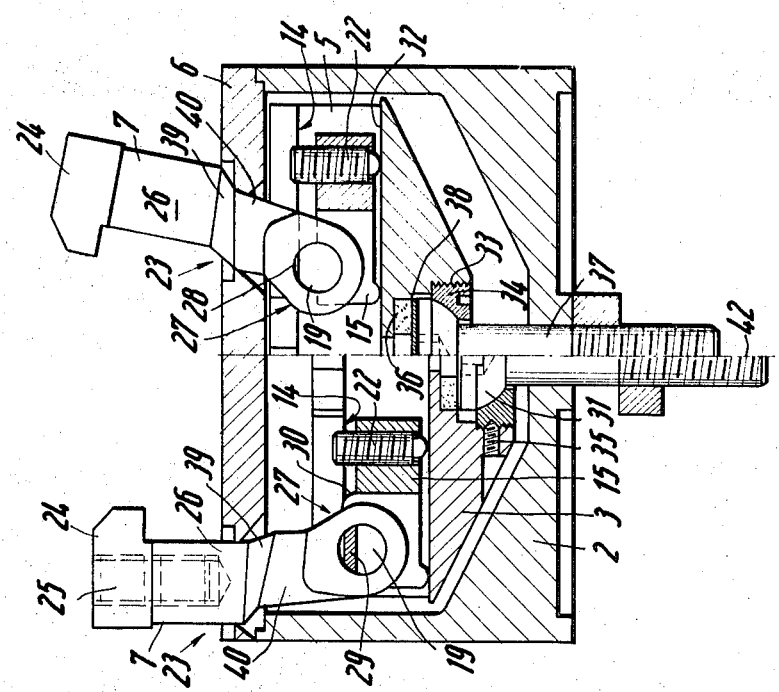
FIG. 2 is a sectional view taken along the line II—II in FIG. 1.
Figure 1:
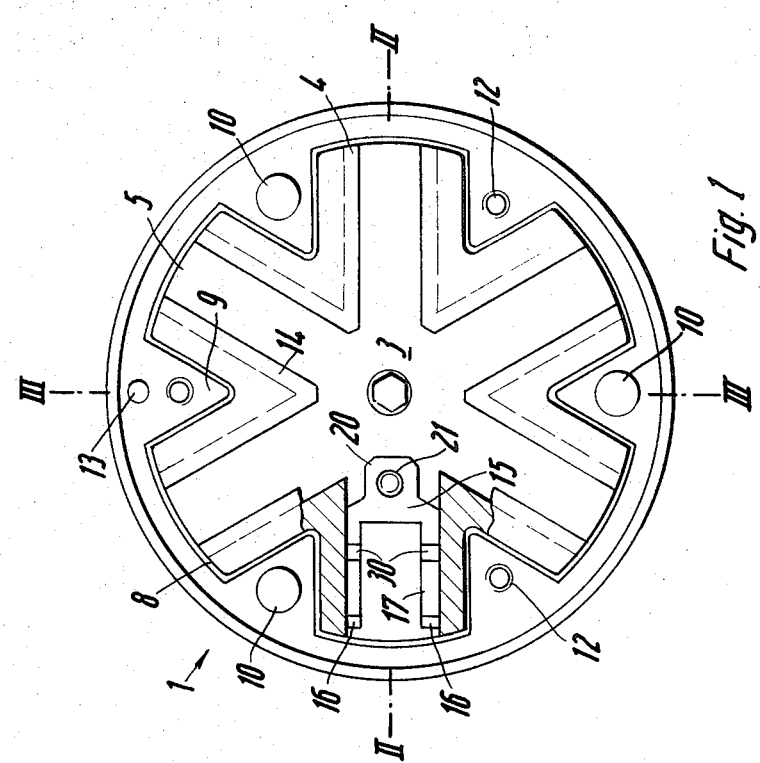
FIG. 1 is a top view of an axial chuck embodying the present invention with the restraining elements and the supporting plate removed from the chuck.

In FIGS. 1, 2 and 3 an axial chuck 1 is shown including a bell-shaped base 2 closed at its lower end and opened at its upper end and containing a carrier 3 having six inwardly directed webs 4 into which retaining grooves 5 are cut. In FIG. 1, to show the arrangement of the webs 4 with the grooves 5, a supporting plate 6, as shown in FIGS. 2 and 3, is removed from the upper open end of the base 2. Further, restraining elements 7 shown in FIGS. 2 and 3 are also omitted in FIG. 1. Radially arranged recesses 8 are formed in the base for receiving the radially outer portions of the webs 4 on the carrier 3. As shown in FIG. 1, six wedge-shaped projections 9 define the opposite sides of the recesses 8 in the base. Every other one of the projections 9 contains a bore 10 into which a fastening screw 11 is positioned for connecting the chuck 1 to a machine tool. The projections 9 which do not contain the bores 10 are provided with threaded bores 12 for receiving bolts which secure the supporting plate 6 to the base. Further, one of the projections 9 containing a threaded bore 12 also contains a fitted bore 13 for a fitted bolt 41 for use in securing the supporting plate to the base. The grooves 5 are T-shaped and the projecting retaining surfaces 14 are indicated by broken lines. The axial center of the carrier is drilled out down to the bottom 32 of the grooves 5. In FIG. 1, a clamping body 15 is shown positioned within one of the grooves 5 on the left hand side of the chuck. The clamping body has a U-shaped or fork-shaped configuration with its legs 16 arranged under the retaining surfaces 14 of the groove 5. Each of the legs 16 has a semi-circular recess 17 for receiving one of the opposite projecting ends 18 of a hinge bolt 19 for the retaining element 7. The closed end or bight part of the clamping body has an inwardly projecting section 20 in which a continuous threaded bore 21 is formed for a locking screw 22, note FIG. 2.

In FIG. 2 several different arrangements of the restraining elements 7 within the chuck are shown. On the left hand side of the center line the carrier 3 and the restraining element 7 are in a retracted position within the base 2, while on the right hand side the carrier 3 is axially displaced from the retracted position with the restraining element 7 displaced axially as well as pivoted relative to the axis of the chuck. Further, on the left hand side of FIG. 2 the closed end of the clamping body 15 is directed inwardly while in the right hand side the closed part is directed outwardly indicating the reversability of the clamping body within the grooves in the carrier. As mentioned above, the supporting plate 6 is secured to the base 2 and the base, in turn, is connected to the machine tool. Openings or bores 23 are formed through the supporting plate 6, as by drilling, and the restraining elements 7 pass outwardly from the interior of the base through the openings 23. As indicated in FIG. 2, the openings 23 are chamfered from the underside of the supporting plate. The outer or free ends of the restraining elements support clamping fingers 24 which are secured to the restraining elements by means of bolts 25 formed with differential threads.

The outer portions of the restraining elements extending through the openings 23 are formed as round shafts 26 with the clamping fingers secured to the outer ends of the shafts. At the inner ends of the shafts offset elliptical sections 39 are provided and when the restraining elements are displaced axially by the carrier, the offset elliptical sections contacting the surfaces of the openings 23 through the supporting plates also provide a pivotal movement to the restraining elements. Inwardly from the elliptical sections 39 an additional offset elliptical section 40 is provided which is connected to a hinge 27 of the restraining element. The hinges 27 are secured within the grooves in the carrier by means of the clamping bodies 15 and each clamping body is locked in place by a locking screw 22. When the locking screw 22 is released the hinge 27 of the restraining element can be displaced radially within the groove 5. When the locking screw is tightened it causes the clamping body to turn about the bottom edges of the legs 16 and the projecting ends of the hinge bolt 19 positioned within the hinge 27 is pressed against the retaining surfaces 14 of the groove and is locked in place. As shown in FIG. 2, the upper surfaces of the ends 18 of the hinge bolts 19 are flattened forming contact points 28 located below the retaining surfaces 14 of the grooves 5. In FIG. 2, the right side shows an arrangement of the clamping bodies for using two or three restraining elements for clamping work pieces to the chuck, while on the left side a special arrangement is shown in which the clamping bodies 15 are used for securing four or six restraining elements in the chuck. In the arrangement shown on the left hand side, a layer of elastic material 29 is positioned between the flattened surface 28 on the ends 18 of the hinge bolts 19 for use when four or six restraining elements are employed. Where four restraining elements are used the layer of elastic material is used with two oppositely disposed restraining elements while the other two oppositely disposed restraining elements do not use the layer of elastic material, such as the arrangement shown on the right hand side in FIG. 2. When six restraining elements are employed, every other one of the elements has the layer of elastic material 29 disposed between the hinge pin and the retaining surface 14 of the groove 5. The restraining elements which use the layer of elastic material 29 must be dimensioned so that the layer of elastic material is compressed 1 to 2 mm by the other restraining elements at the commencement of the clamping action of a work piece to the chuck.

To prevent the deformation of the layer of elastic material by the clamping body 15, the clamping body has cams 30 formed on each leg positioned between the recess for the hinge bolt ends 18 and the closed end 20 and the cams bear against the retaining surfaces 14 before the layer of elastic material is deformed.

In FIG. 2 the clamping fingers 24 are positioned for clamping about the outer periphery of a work piece, however, the clamping fingers can be reversed so that they project radially outwardly rather than inwardly for holding an inner edge or portion of a work piece.

The chuck 1 is provided for use with work pieces of a particularly small diameter. Accordingly, ball 31 of a ball and socket joint securing the carrier to a tie rod 37, is positioned below the bottom 32 of the groove 5. Accordingly, the clamping body 15 can extend practically to the central axis of the chuck, such as is shown in the right hand side of FIG. 2. The socket portion of the ball and socket joint is formed by a part 34 having a male thread 33 which is screwed into the carrier 3 and locked in place by a setscrew 35. As indicated in FIGS. 2 and 3 the upper surface of the ball 31 is cut in a chordal manner providing a flat surface on the ball spaced parallel with and below the bottom 32 of the grooves 5 in the carrier. Between the flat surface on the ball 31 and the carrier 3, an elastic element 36 is positioned which presses the carrier to a position perpendicular to the tie rod 37. A metal disc 38 is provided on the underside of the element 36 to reduce friction.

In FIG. 3, on the right hand side, the fitted pin 41 and a screw 39 are shown for fastening the supporting plate 6 to the base 2. On the left hand side of the Figure a fastening screw 11 is shown for connecting the chuck to a machine tool spindle. Further, the projecting ends 18 of the hinge pin 19 are shown disposed below the retaining surfaces 14 of the groove 5. In FIG. 3 the closed end 20 of the clamping body is not shown so that the arrangement of the hinge pin 19 can be illustrated.

The chuck is operated in a known manner by pushing the tie rod in the axial direction for opening or unlocking the restraining elements with the clamping fingers moved upwardly as shown in the right hand side of FIG. 2. As the restraining elements are guided through the openings 23 in the supporting plate by the movement of the carrier, the elements are also pivoted so that the clamping fingers move radially outwardly away from the axis of the chuck. After positioning a work piece within the chuck, the tie rod is retracted or tightened and the restraining elements effect a reverse movement moving inwardly toward the base 2 with the clamping fingers swinging radially inwardly toward the axis. The axis of the tie rod 37 coincides with the axis of rotation 42 of the chuck 1. A stop 43 is positioned on the tie rod exteriorly of the base 2 and it limits the movement of the tie rod and, in turn, of the carrier so that the carrier does not contact the inner surface of the supporting plate 6. As shown in FIGS. 2 and 3, the stop is formed of a nut screwed on the tie rod 37. In FIG. 2 the two positions of the stop are indicated, on the right hand side the stop is in contact with the outside surface of the base 2 limiting the movement of the restraining elements in the unlocked or released position. On the left hand side in FIG. 2, the carrier 3 is retracted into the base and the stop 43 is spaced from the outer surface of the base.

In FIG. 4 a chuck is illustrated having a base 51 which supports an axially displaceable bearing body 52 having a calotte-shaped recess 53 in which is mounted a spherical body 54 having a shape conforming to the calotte-shaped recess 53 and being rigidly connected with a carrier 55. A ball 56 is provided on a tie rod 57 and serves to hold the body 54 against the bearing body 52. The spherical surfaces of the ball 56, of the body 54, and of the recess 53 have the same center so that the carrier 55 can be adjusted to rotate freely about the center. The carrier 55 has three webs 80 which extend inwardly in a star-shaped form spaced angularly apart by 120° and forming therebetween three radially extending T-shaped grooves 58. Within each groove 58, a clamping body 59 is secured by means of a locking screw 60. The legs of the clamping body press the projecting ends of the hinge bolt 61 into bearing contact with the retaining surfaces 82 of the grooves 58. Restraining element 62 has a guide portion 63 in contact with the opening through the supporting plate 65 and the guide portion 63 is curved in accordance with a modulation curve. A clamping finger 66 is connected to the restraining element 62 by means of a bolt 67 with a differential thread.

The supporting plate 65 is connected to the base 51 by screws 68.

In operating the chuck shown in FIG. 4, if the tie rod 57 is moved downwardly in the axial direction, as viewed in FIG. 4, by another member actuated manually or by an auxiliary force, the bearing body 52, the body 54, the carrier 55 and the ball 56 are also displaced in the same direction. In addition, the carrier 55 displaces the clamping body 59 in the downward direction and, as a result, the restraining element 62 is moved axially downwardly and as its guide portion 63 moves in contact with the surface of the opening 64 in the supporting plate 65, a pivotal movement of the restraining element takes place and the restraining element and its clamping finger assume the position shown in dot-dash lines. In the axially retracted position of the carrier 55, the clamping finger 66 on the restraining element 62 bears against the surface of a work piece. If the surface contacted by the contacting finger on the work piece is not exactly parallel to the surface of the supporting plate, or if the restraining elements 62 do not have the same length or if the clamping bodies 59 are not of exactly the same size, inaccuracies are compensated by the pivotal movement of the carrier due to the spherical surfaces of the recess 53 and of the body 54 and also of the spherical surface of the body 56, so that the work piece is firmly clamped.

If another work piece having a different diameter is to be clamped in the chuck, the screws 67 and 68 are loosened and the clamping fingers 66 and the supporting plate 65 are removed. Next, the screw 60 in the clamping body 59 is released and then secured when the carrier has been repositioned as necessary for the new work piece. A new supporting plate 65 having bores 64 corresponding to the new position of the restraining elements 62 is attached to the base 51. The bores or openings 64 are provided in the supporting plate so that the restraining elements 62 can be easily passed through the opening 64. Then the clamping fingers are again secured to the restraining elements.

If the restraining elements are to be mounted on a very small radius, that is if they are to be arranged very close together, the clamping body 59 is inserted into the groove 58 so that the locking screw 60 is located radially outwardly relative to the hinge of the restraining element which is the reverse of the arrangement shown in FIG. 4.

If the axial chuck is to be used for clamping about the radially inner portion of a work piece, the restraining elements are secured in the grooves so that they are reversed 180° from that shown in FIG. 4, that is with the clamping fingers directed outwardly rather than inwardly.

Figure 5:
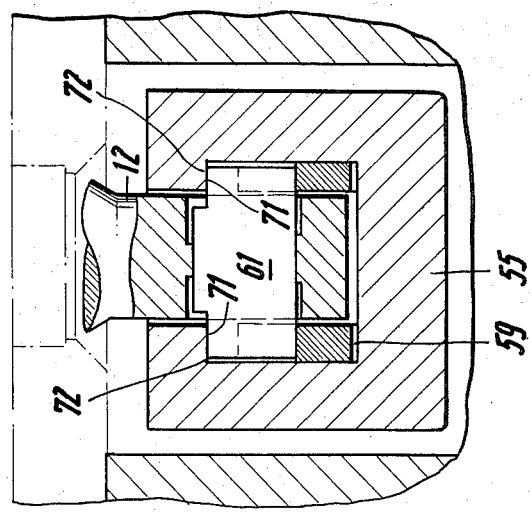
FIG. 5 is a transverse sectional view through a portion of the axial chuck in FIG. 4 illustrating an inserted clamping body.

In FIG. 5, the hinge bolts 61 have flat portions 71 at the opposite ends arranged to contact the retaining shoulder surfaces 72 of the T-shaped grooves 58 in the carrier 55 so that the restraining force is transmitted directly from the hinge bolts to the carrier without the clamping body being stressed.

Figure 6:
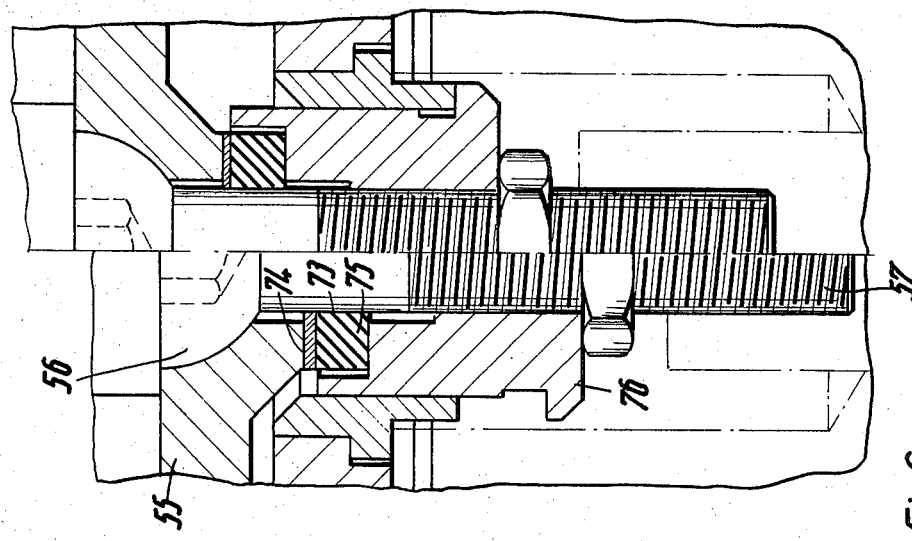
FIG. 6 is a sectional view through the center portion of another chuck, in accordance with the present invention.

In the embodiment illustrated in FIG. 6, the tie rod 57 and the body 56 are provided with spherical surfaces similar to that shown in FIG. 4. However, the carrier 55 has a plane surface 73 which bears against a steel plate 74 and, in turn, the plate bears on a rubber elastic body 75 supported by the end face of a recess in the bearing body 76 which otherwise corresponds to the bearing body 52 in FIG. 4. The rubber elastic body 75 presses the carrier 55 into a position perpendicular to the axis of the tie rod 57. The plate 74 prevents the top side of the elastic body from being damaged by the surface 73.

While specific embodiments of the invention have been shown and described in detail to illustrate the application of the inventive principles, it will be understood that the invention may be embodied otherwise without departing from such principles.

What is claimed is:

1. A chuck arrangement comprising an axially extending base member closed at one end transverse to its axis and open at its opposite end with enclosing sides extending between the ends, a carrier axially displaceably positioned within said base member, a tie rod extending axially into said base member and articulated to said carrier for effecting the axial displacement of said carrier, a supporting plate secured across the open end of said base member, said supporting plate having openings extending therethrough, and a plurality of restraining elements articulated to said carrier and extending through the openings in said supporting plate, said restraining elements having curved surfaces in the range of the openings in said supporting plate and being displaceable through and guided by the openings, wherein the improvement comprises that each said restraining element comprises a shaft extending through the opening in said supporting plate and a clamping finger secured to the end of said shaft exteriorly of said supporting plate, said shaft having an axially extending round section connected to said clamping finger and a curved section secured to and offset relative to said axially extending section, said curved surface section being disposed in contact with the surface of the opening through said supporting plate for effecting the pivoting action of said restraining elements while also providing a sealing action against the introduction of foreign matter into the chuck as said carrier and restraining elements are displaced in the axial direction.

2. A chuck arrangement comprising an axially extending base member closed at one end transverse to its axis and open at its opposite end with enclosing sides extending between the ends, a carrier axially displaceably positioned within said base member, a tie rod extending axially into said base member and articulated to said carrier for effecting the axial displacement of said carrier, a supporting plate secured across the open end of said base member, said supporting plate having openings extending therethrough, and a plurality of restraining elements articulated to said carrier and extending through the openings in said supporting plate, said restraining elements having curved surfaces in the range of the openings in said supporting plate and being displaceable through and guided by the openings, wherein the improvement comprises that each said restraining element comprises a shaft extending through the openings in said supporting plate and a clamping finger secured to the end of said shaft exteriorly of said supporting plate, said opening in said supporting plate being chamfered from the surface of said supporting plate facing inwardly into said base member, said shaft having an axially extending round section connected to said clamping finger and a curved section secured to and offset relative to said axially extending section, said curved surface section being elliptically shaped and having its axis offset relative to the axis of said axially extending round section, said curved surface section being disposed in contact with the surface of the opening through said supporting plate for effecting the pivoting action of said restraining elements as said carrier and restraining elements are displaced in the axial direction.

3. A chuck arrangement comprising an axially extending base member closed at one end transverse to its axis and open at its opposite end with enclosing sides extending between the ends, a carrier axially displaceably positioned within said base member, a tie rod extending axially into said base member and articulated to said carrier for effecting the axial displacement of said carrier, a supporting plate secured across the open end of said base member, said supporting plate having openings extending therethrough, and a plurality of retraining elements articulated to said carrier and extending through the openings in said supporting plate, said restraining elements having curved surfaces in the range of the openings in said supporting plate and being displaceable through and guided by the openings, wherein the improvement comprises that each said restraining element comprises a shaft extending through the opening in said supporting plate and a clamping finger secured to the end of said shaft exteriorly of said supporting plate, said shaft having an axially extending section connected to said clamping finger and a curved section secured to and offset relative to said axially extending section, said curved surface section being disposed in contact with the surface of the opening through said supporting plate for effecting the pivoting action of said restraining elements as said carrier and restraining elements are displaced in the axial direction, said carrier having a plurality of radially extending grooves therein, and each said restraining element having a hinge portion positioned within and radially displaceable through and lockable within said grooves.

4. A chuck arrangement comprising an axially extending base member closed at one end transverse to its axis and open at its opposite end with enclosing sides extending between the ends, a carrier axially displaceably positioned within said base member, a tie rod extending axially into said base member and articulated to said carrier for effecting the axial displacement of said carrier, a supporting plate secured across the open end of said base member, said supporting plate having openings extending therethrough, and a plurality of restraining elements articulated to said carrier and extending through the openings in said supporting plate, said restraining elements having curved surfaces in the range of the openings in said supporting plate and being displaceable through and guided by the openings, wherein the improvement comprises that each said restraining element comprises a shaft extending through the opening in said supporting plate and a clamping finger secured to the end of said shaft exteriorly of said supporting plate, said shaft having an axially extending section connected to said clamping finger and a curved section secured to and offset relative to said axially extending section, said curved surface section being disposed in contact with the surface of the opening through said supporting plate for effecting the pivoting action of said restraining elements as said carrier and restraining elements are displaced in the axial direction, a removable clamping member displaceably secured to each said restraining element, said clamping fingers being positionable for extending radially inwardly or radially outwardly from said restraining element.

5. A chuck arrangement, as set forth in claim 3, characterized in that said carrier has a plurality of radially extending webs and said grooves are cut into said webs.

6. A chuck arrangement, as set forth in claim 5, characterized in that said carrier has six said webs arranged in equiangularly spaced arrangement.

7. A chuck arrangement, as set forth in claim 5, characterized in that said base has a plurality of radially arranged recesses formed therein corresponding in number and form for receiving said radially extending webs of said carrier.

8. A chuck arrangement, as set forth in claim 3, characterized in that a clamping body is positioned within the groove in said carrier for securing one of said restraining elements in position, a hinge bolt extending through the hinge portion of said restraining element for securing the latter to said clamping body within said groove, said hinge bolt having the ends thereof projecting outwardly from the hinge portion of said restraining element, and said clamping body pressing the ends of said hinge bolt against the upper retaining surfaces of said grooves.

9. A chuck arrangement, as set forth in claim 8, characterized in that said clamping body has a U-shaped configuration with each of its legs extending radially along said radially extending grooves, and a locking screw positioned in the closed end of the said U-shaped clamping body for locking said clamping body within said groove in said carrier.

10. A chuck arrangement, as set forth in claim 8, characterized in that the direction of insertion of said clamping bodies in said grooves is reversible by turning said clamping body through 180°.

11. A chuck arrangement, as set forth in claim 8, characterized in that the projecting ends of said hinge bolts are flattened on the surfaces thereof in contact with the retaining surfaces of said radially extending grooves in said carrier.

12. A chuck arrangement, as set forth in claim 11, characterized in that a layer of elastic material is inserted between certain of the flattened surfaces on the ends of said hinge bolts and said retaining surfaces on said grooves.

13. A chuck arrangement, as set forth in claim 12, characterized in that the legs of said U-shaped clamping body each have a recess for supporting the projecting ends of said hinge bolt, and a cam formed on the upper surface of each leg of said U-shaped clamping body located between the closed end thereof and the hinge bolt recess for bearing against the retaining surface of said grooves so that said layer of elastic material is not deformed.

14. A chuck arrangement, as set forth in claim 8, characterized in that the closed end of said U-shaped clamping body has an offset section which has a smaller width than the distance between the opposite edges of the retaining surfaces of said grooves.

15. A chuck arrangement, as set forth in claim 5, characterized in that said carrier has an open space extending downwardly from its upper surface to the bottom of said grooves therein and the periphery of said opening is defined by the radially inner edges of said webs.

16. A chuck arrangement, as set forth in claim 15, characterized in that a tie rod extends through the closed end of said base member and has a ball at its end secured in a ball and socket type joint within said carrier, said ball being cut in a chordal manner forming a flattened surface at its upper end and said flattened surface extending in parallel relationship with and not higher than the bottom of the grooves in said carrier.

17. A chuck arrangement, as set forth in claim 16, characterized in that a prestressed elastic element having a metal disc on one side is positioned between said carrier and the flattened surface of said ball.

18. A chuck arrangement, as set forth in claim 4, characterized in that threaded bolts having differential threads are arranged for connecting said clamping fingers to said restraining elements.

19. A chuck arrangement, as set forth in claim 4, characterized in that threaded bolts with oppositely directed threads thereon connect said clamping fingers to said restraining elements.

20. A chuck arrangement, as set forth in claim 16, characterized in that a stop is secured to said tie rod exteriorly of said base for limiting the axial movement of said tie rod.

* * * * *